(12) United States Patent
Sawai

(10) Patent No.: US 11,659,115 B2
(45) Date of Patent: May 23, 2023

(54) IMAGE PROCESSING APPARATUS, CREASE FORMING DEVICE, AND FOLDING DEVICE SPECIFYING THE POSITION OF A FOLDING LINE BASED ON ACQUIRING FIRST IMAGE INFORMATION AND SECOND IMAGE INFORMATION

(71) Applicant: FUJIFILM Business Innovation Corp., Tokyo (JP)

(72) Inventor: Kenji Sawai, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 15/930,431

(22) Filed: May 12, 2020

(65) Prior Publication Data

US 2021/0105377 A1    Apr. 8, 2021

(30) Foreign Application Priority Data

Oct. 3, 2019    (JP) ............................. JP2019-182813

(51) Int. Cl.
*H04N 1/58* (2006.01)
*H04N 1/00* (2006.01)

(52) U.S. Cl.
CPC ....... *H04N 1/00639* (2013.01); *H04N 1/0075* (2013.01); *H04N 1/00737* (2013.01)

(58) Field of Classification Search
CPC .......... H04N 1/00639; H04N 1/00737; H04N 1/00748; H04N 1/0075; H04N 2201/0434; H04N 2201/00726; H04N 2201/00827

USPC ................................................ 358/1.11–1.18
See application file for complete search history.

(56) References Cited

U.S. PATENT DOCUMENTS

| 6,330,050 | B1 * | 12/2001 | Takahashi | ............ | H04N 1/1048 |
| | | | | | 399/362 |
| 6,816,624 | B1 * | 11/2004 | Ebisawa | ................ | H04N 1/401 |
| | | | | | 382/293 |
| 2003/0198398 | A1 * | 10/2003 | Guan | ..................... | H04N 1/387 |
| | | | | | 382/286 |
| 2008/0170262 | A1 * | 7/2008 | Takahashi | .......... | G06K 15/1868 |
| | | | | | 358/1.15 |

(Continued)

FOREIGN PATENT DOCUMENTS

| JP | 2007166431 A | * | 6/2007 |
| JP | 2015173350 | | 10/2015 |
| JP | 2018207398 | | 12/2018 |

*Primary Examiner* — Chad Dickerson
(74) *Attorney, Agent, or Firm* — JCIPRNET

(57) ABSTRACT

An image processing apparatus includes a processor configured to: acquire image information obtained by an image reading apparatus including an illumination unit having an uneven balance in an amount of light in a sub-scanning direction; and specify a position of a folding line in a sheet from the acquired image information. The acquiring by the processor includes acquiring first image information obtained by reading the sheet in a first state in which the folding line in the sheet is positioned in a direction intersecting the sub-scanning direction of the image reading apparatus, and second image information obtained by reading the sheet in a second state in which the sheet is directed to an opposite side to a side in the first state. The specifying by the processor includes specifying the position of the folding line in the sheet based on the first image information and the second image information.

18 Claims, 9 Drawing Sheets

(56) References Cited

U.S. PATENT DOCUMENTS

| | | | |
|---|---|---|---|
| 2009/0121407 A1* | 5/2009 | Kawamura | G03G 15/6538 270/32 |
| 2009/0180160 A1* | 7/2009 | Cui | H04N 1/02815 358/475 |
| 2009/0316223 A1* | 12/2009 | Takeuchi | H04N 1/02885 358/474 |
| 2015/0264214 A1 | 9/2015 | Kawanishi | |
| 2018/0359383 A1* | 12/2018 | Tada | G06V 30/414 |
| 2019/0116292 A1* | 4/2019 | Fujiki | H04N 1/38 |

* cited by examiner

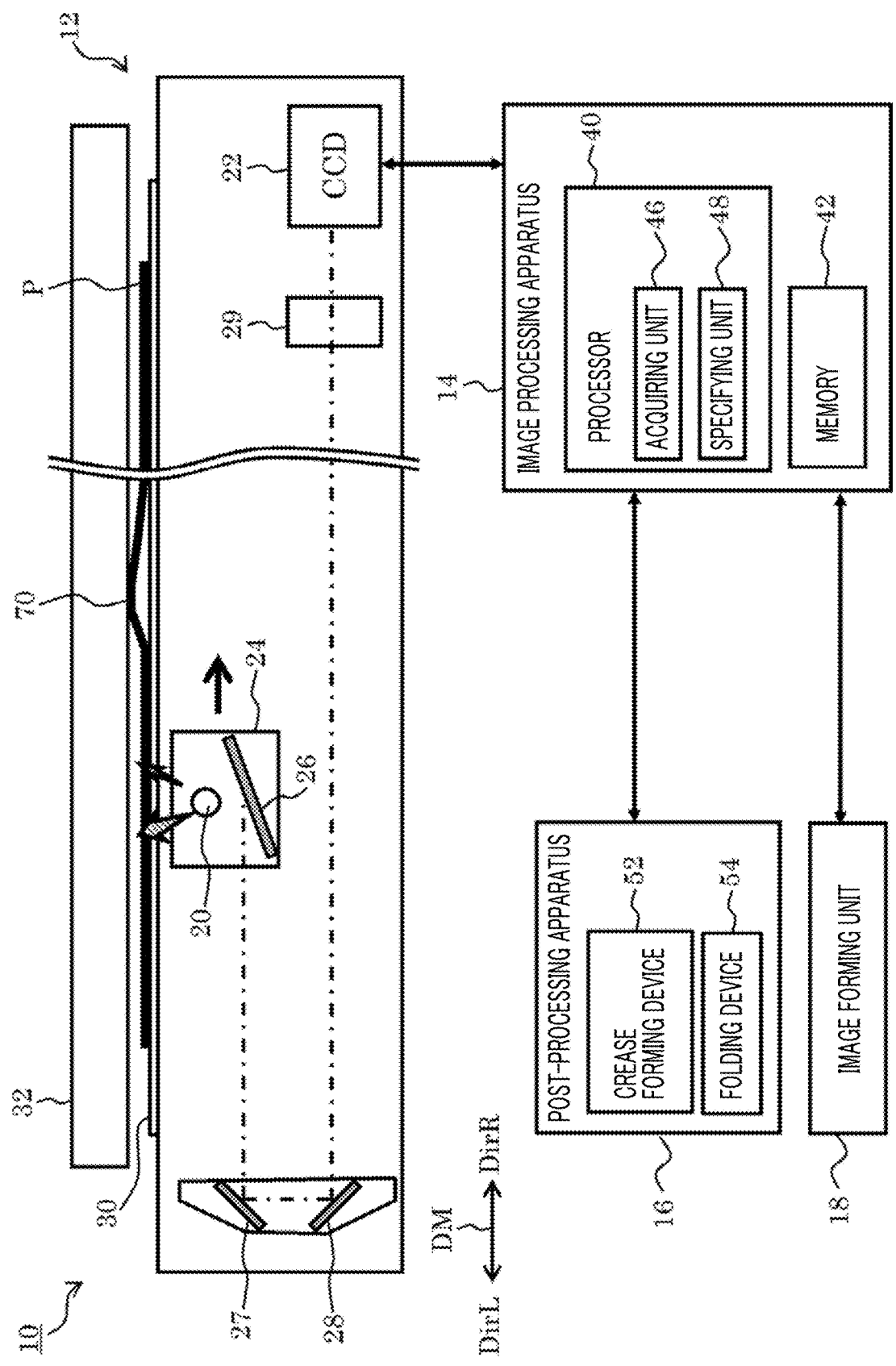

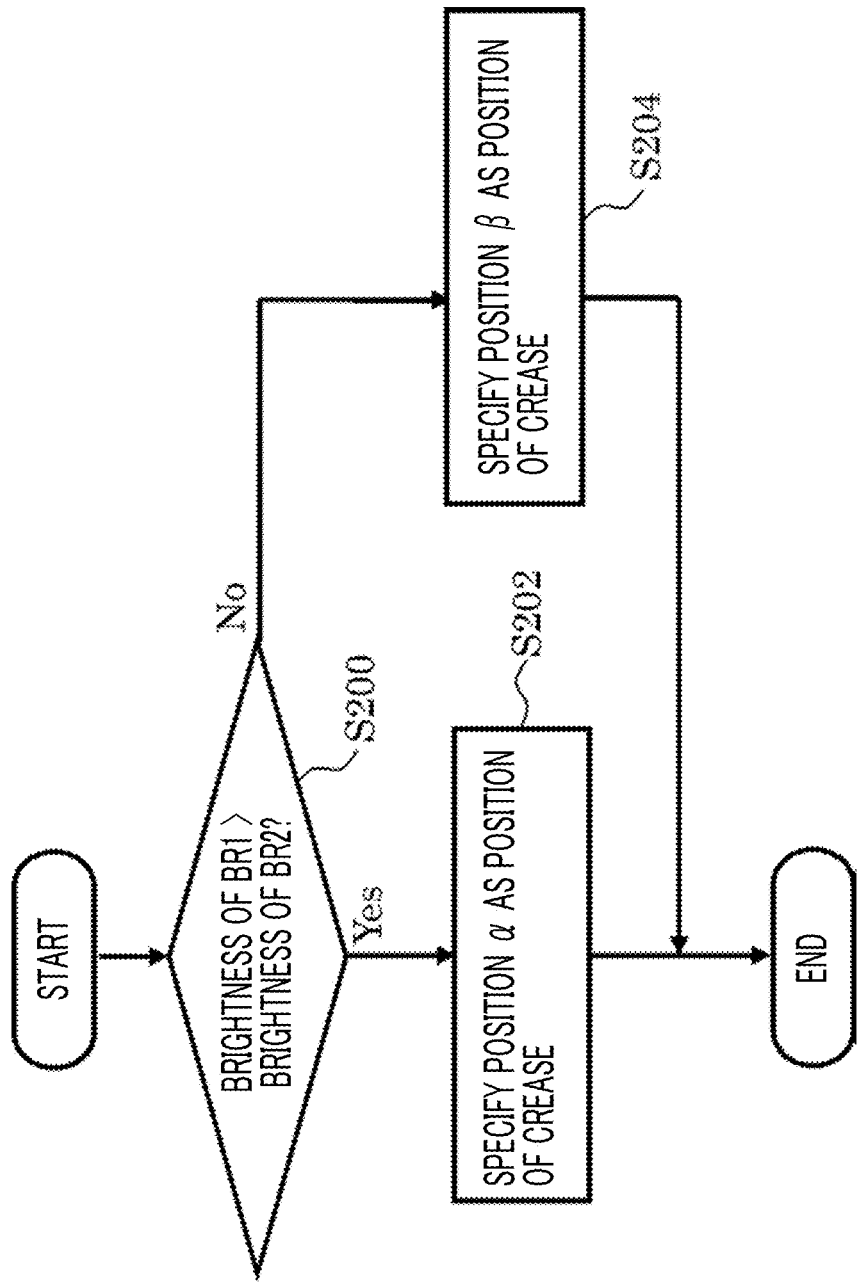

IMAGE PROCESSING APPARATUS, CREASE FORMING DEVICE, AND FOLDING DEVICE SPECIFYING THE POSITION OF A FOLDING LINE BASED ON ACQUIRING FIRST IMAGE INFORMATION AND SECOND IMAGE INFORMATION

CROSS-REFERENCE TO RELATED APPLICATIONS

This application is based on and claims priority under 35 USC 119 from Japanese Patent Application No. 2019-182813 filed Oct. 3, 2019.

BACKGROUND

1. Technical Field

The present disclosure relates to an image processing apparatus, a crease forming device, and a folding device.

2. Related Art

An automatic crease forming device (hereinafter, simply referred to as a crease forming device) performs a process of forming a crease that is formed in a sheet to straightly fold the sheet at a desired position. An automatic folding device (hereinafter, simply referred to as a folding device) performs a process of folding sheets. In order to know whether a position of a crease where a sheet is creased or a position of a fold where a sheet is folded (also referred to as a folding position) is at a desired position, the sheet may be read by an image reading apparatus to detect and confirm the position of the crease or the position of the fold.

JP-A-2018-207398 discloses an image reading apparatus that includes a light receiving unit that receives reflected light from an original document, and a first light emitting unit and a second light emitting unit that are disposed upstream and downstream, respectively, with the light receiving unit interposed therebetween in a reading direction of the original document, and that compares a first image obtained by reading the original document in a state in which only the first light emitting unit emits light with a second image obtained by reading the original document in a state in which only the second light emitting unit emits light, thereby specifying a position of a fold of the original document.

JP-A-2015-173350 discloses a reading control device which controls a reading apparatus including a light source for irradiating an original document on a document table with light and a sensor for receiving reflected light from the original document, switches an irradiation angle of the light source with respect to the original document at plural angles to acquire a read image of the original document corresponding to each of plural irradiation angles, and detects an uneven portion of the original document based on the plural acquired read images.

SUMMARY

In some cases, a position of the crease or a position of the fold cannot be detected by the image reading apparatus because the crease is weakly formed in the sheet or the sheet is weakly folded due to the influence of the hardness of the sheet or the like.

Aspects of non-limiting embodiments of the present disclosure relate to making it possible to specify a position of a crease or a fold in a sheet even when the crease is weakly formed or the sheet is weakly folded. Hereinafter, creases and folds are collectively referred to as "folding lines".

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor. The processor is configured to: acquire image information obtained by an image reading apparatus including an illumination unit having an uneven balance in an amount of light in a sub-scanning direction; and specify a position of a folding line in a sheet from the acquired image information. The acquiring by the processor includes acquiring first image information obtained by reading the sheet in a first state in which the folding line in the sheet is positioned in a direction intersecting the sub-scanning direction of the image reading apparatus, and second image information obtained by reading the sheet in a second state in which the sheet is directed to an opposite side to a side in the first state. The specifying by the processor includes specifying the position of the folding line in the sheet based on the first image information and the second image information.

BRIEF DESCRIPTION OF THE DRAWINGS

Exemplary embodiment(s) of the present disclosure will be described in detail based on the following figures, wherein:

FIG. 1 is a schematic diagram illustrating a schematic configuration of an image forming apparatus;

FIG. 8 is a flowchart illustrating a flow of specifying a position of a crease when the other illumination unit is used;

DETAILED DESCRIPTION

Figure 2A:
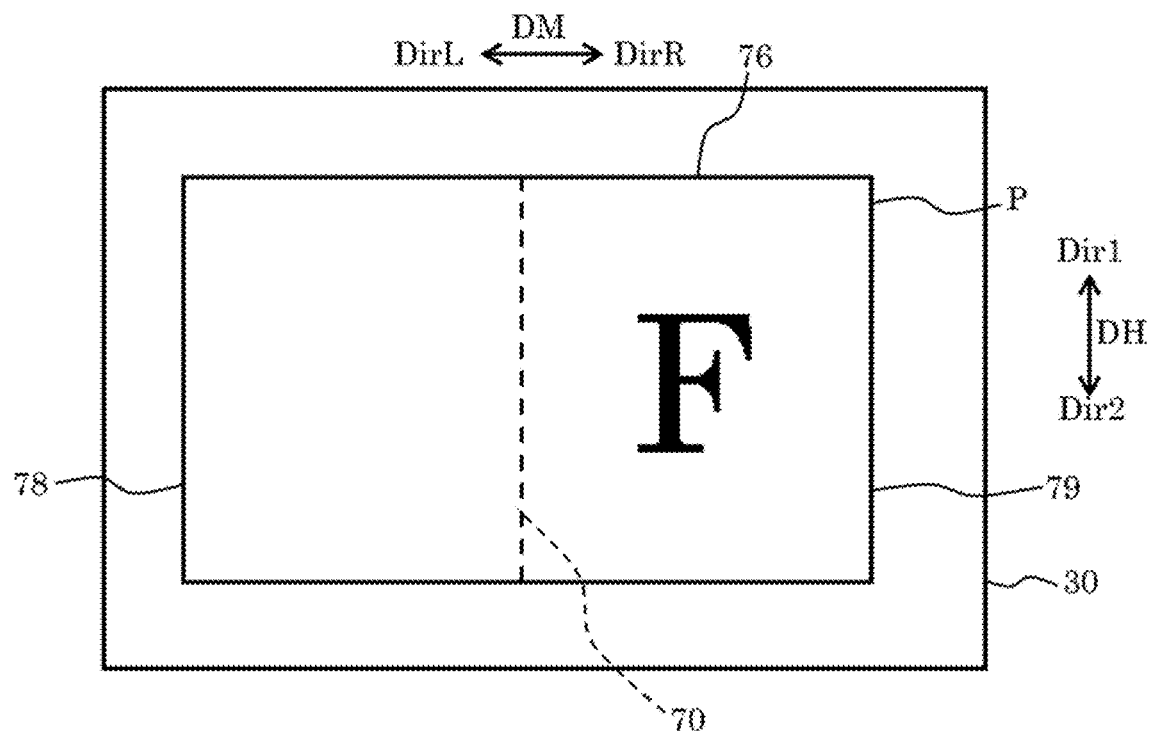
FIG. 2A is a diagram illustrating an example of how a sheet is placed on a platen glass in first sheet reading.

Hereinafter, exemplary embodiments of the present disclosure will be described in detail with reference to the accompanying drawings. The configuration described below is an example for description, and can be appropriately changed in accordance with the specification of the device or the like. In all the drawings, the same elements are denoted by the same reference numerals, and repeated description thereof will be omitted.

Figure 9A:
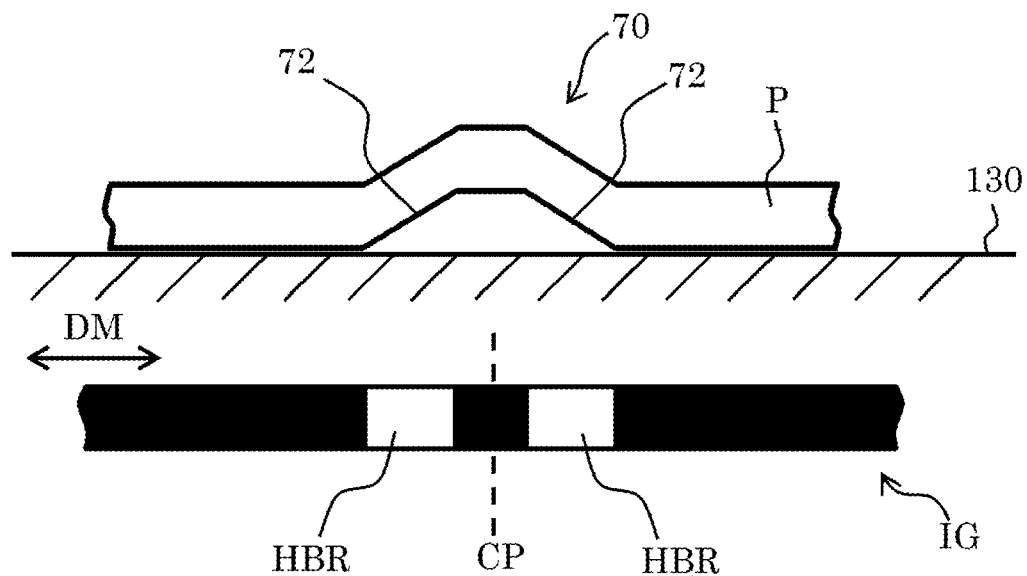
FIG. 9A is a diagram illustrating reading of a sheet having a strong crease in a related art and image information.

In the exemplary embodiment of the present disclosure, a position of a weak crease in a sheet is specified using an image reading apparatus. In the related art, it is possible to specify a position of a strong crease using an image reading apparatus, but it is difficult to specify a position of a weak crease. FIG. 9A is a diagram illustrating (i) how to read a sheet having a strong crease in the related art (a cross section of a sheet P and a platen glass 130 of the image reading apparatus) and (ii) image information IG obtained by reading. The image information IG illustrated in FIG. 9A and FIG. 9B to be described later is image information of a partial region of the sheet P in the direction along a crease 70. As illustrated in FIG. 9A, in the sheet P on which the strong crease is formed, a recess is present at the position of the crease 70. Two steeply inclined surfaces 72 are also present that form opposed wall surfaces of the recess. For example, as illustrated in FIG. 9A, when the sheet P is placed on the platen glass 130 of the image reading apparatus so that the recess of the crease 70 faces down and the crease 70 is in a direction intersecting a sub-scanning direction DM of the image reading apparatus (a moving direction of the illumination unit of the image reading apparatus), and the sheet P is read, two high brightness portions HBR corresponding to the two steeply inclined surfaces 72 appear in the image information IG obtained by reading. Therefore, a center position CP of the two high brightness portions HBR can be specified as a position of the crease 70.

Figure 9B:
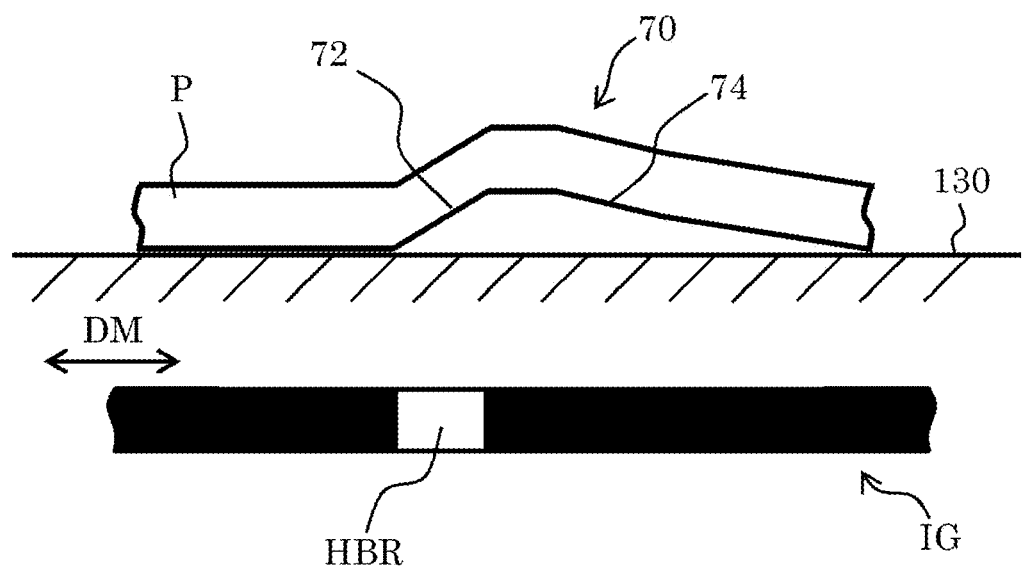
FIG. 9B is a diagram illustrating reading of a sheet having a weak crease in the related art and image information.

However, a crease in sheets having a strong tensility, such as thick paper, is a weak crease and thus a recess may not be formed clearly. FIG. 9B is a diagram illustrating (i) how to read a sheet having a weak crease in the related art (a cross section of the sheet P and the platen glass 130 of the image reading apparatus) and (ii) image information IG obtained by reading. As illustrated in FIG. 9B, the weak crease 70 often includes one steeply inclined surface 72 and one gently inclined surface 74. In this case, when the sheet P is read by the image reading apparatus, only one high brightness portion HBR corresponding to one steeply inclined surface 72 appears in the image information IG obtained by reading, and therefore, the position of the crease 70 (also referred to as the center position) cannot be specified from the image information IG. The exemplary embodiment of the present disclosure may specify a position of the crease even in such a weak crease. In the exemplary embodiment of the present disclosure, a sheet P is read twice by an image reading apparatus including an illumination unit having an uneven balance in an amount of light, and the position of the crease in the sheet P is specified based on first image information and second image information obtained by reading. Hereinafter, exemplary embodiments according to the present disclosure will be described in detail.

FIG. 1 is a schematic diagram illustrating a schematic configuration of an image forming apparatus 10 according to an exemplary embodiment of the present disclosure. The image forming apparatus 10 includes an image reading apparatus 12 (also referred to as an image scanner), an image processing apparatus 14, an image forming unit 18, and a post-processing apparatus 16. The image forming apparatus 10 is configured such that a job is input from the outside of the image forming apparatus 10, and based on the job, the post-processing apparatus 16 can perform a crease forming process and a folding process on the sheet P with or without the image forming unit 18 forming an image on the sheet P. The crease is formed in the sheet to cleanly fold the sheet at a desired position or the like. The crease may also be referred to as a crease streak.

The post-processing apparatus 16 includes a crease forming device 52 that performs a crease forming process on a sheet, and a folding device 54 that performs a folding process on the sheet. The position of the crease 70 formed by the crease forming device 52 may deviate from a desired position. Therefore, it is necessary to correct the position where the crease is formed by the crease forming device 52. In the image forming apparatus 10 according to the exemplary embodiment of the present disclosure, the sheet P on which the crease 70 is formed by the crease forming device 52 is read twice by the image reading apparatus 12, and the image processing apparatus 14 specifies a position of the crease based on first image information and second image information obtained by reading. The specified position of the crease or the amount of deviation between the specified position of the crease and the desired position of the crease is sent to the crease forming device 52, and the crease forming device 52 corrects the position where the crease is formed in the sheet based on the information. As a result, the position of the crease 70 formed on the sheet P by the crease forming device 52 thereafter becomes a desired position or closer to the desired position.

The image reading apparatus 12 includes a platen glass 30 on which the sheet P having the crease 70 formed thereon is placed, a platen cover 32 that presses the sheet P onto the platen glass 30, an illumination unit 20 that illuminates the sheet P placed on the platen glass 30, and a charge coupled device (CCD) 22 (also referred to as a light receiving unit) that receives reflected light from the sheet P. The illumination unit 20 is mounted on a carriage 24 that moves in the sub-scanning direction DM (left-right direction in FIG. 1), scans the sheet P with light as the carriage 24 moves, and reflected light from the sheet P is guided to the CCD 22 through a mirror 26 mounted on the carriage 24, fixed mirrors 27 and 28, and a lens 29. The CCD converts the reflected light into an electrical signal to generate image information.

The illumination unit 20 includes only a lamp which is a light source, or a lamp and an optical system surrounding the lamp. Here, the illumination unit 20 has characteristics such that a balance in an amount of light in the sub-scanning direction DM is uneven. The characteristics are achieved, for example, by using a lamp having an uneven balance in an amount of light, using an optical system that makes a balance in an amount of light uneven, or a combination thereof. In the illumination unit 20 illustrated in FIG. 1, the amount of light on a second side DirR is smaller than the amount of light on a first side DirL in the sub-scanning direction DM.

The image processing apparatus 14 includes a processor 40 and a memory 42. The processor 40 functions as an acquiring unit 46 that acquires image information obtained by the image reading apparatus 12, and a specifying unit 48 that specifies a position of the crease 70 in the sheet P from the acquired image information. The memory 42 is, for example, a memory including semiconductor elements (for example, such as a RAM or a flash memory), a hard disk, or the like and temporarily stores the acquired image information or the like. The image processing apparatus 14 is electrically connected to the image reading apparatus 12, the image forming unit 18, and the post-processing apparatus 16. The image processing apparatus 14 can transmit and receive data with them.

The entire image forming apparatus 10 is controlled by a processor of a system controller (not illustrated). The processor of the system controller controls the image reading apparatus 12, the image processing apparatus 14, the image forming unit 18, and the post-processing apparatus 16 in accordance with a job input from the outside of the image forming apparatus 10, an instruction from an operation panel (not illustrated) such as a touch panel provided in the image forming apparatus 10, or the like. Meanwhile, such control may be performed by the processor 40 of the image processing apparatus 14.

Next, the process of specifying a position of the crease 70 in the sheet P will be described. As described above, the sheet P is read twice, and a position of the crease 70 in the sheet P is specified based on the first image information and the second image information obtained by reading.

Figure 2B:
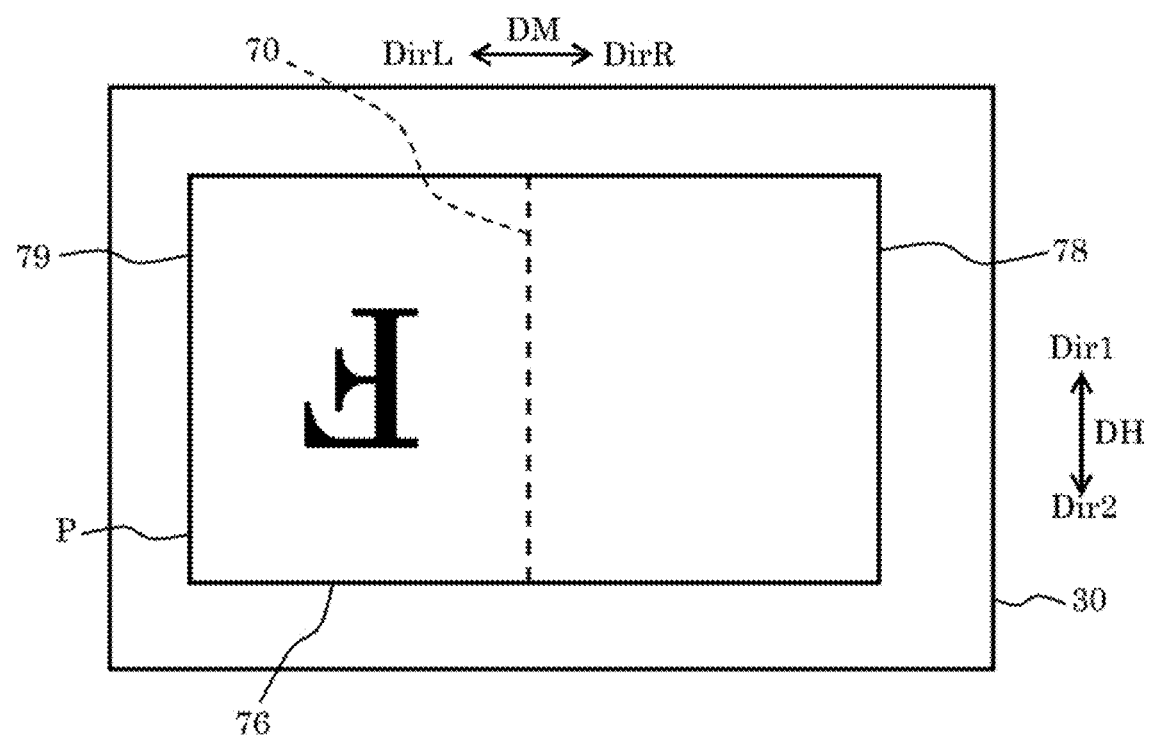
FIG. 2B is a diagram illustrating an example of how the sheet is placed on the platen glass in second sheet reading.

FIG. 2A is a diagram illustrating an example of how the sheet P is placed on the platen glass 30 in first sheet reading (first state). FIG. 2B is a diagram illustrating an example of how the sheet P is placed on the platen glass 30 in second sheet reading (second state). A letter F on the sheet P in FIGS. 2A and 2B is drawn to facilitate understanding of the orientation of the sheet P, but is not essential. Here, the letter F may be printed on the sheet P so that an operator or the like can understand the orientation of the sheet P, or another letter, symbol, pattern, or the like may be printed on a predetermined portion of the sheet P. As illustrated in FIG. 2A, in the first time, the sheet P is read in a state (a first state) in which an upper side 76 of the sheet is directed to a first side Dir1 in a main scanning direction DH (direction perpendicular to the sub-scanning direction DM). As illustrated in FIG. 2B, in the second time, the sheet P is read in a state in which the upper side 76 of the sheet is directed to a second side Dir2 in the main scanning direction DH. The state in the second time may be referred to as a second state and is the same as a state in which the sheet P is directed to a side opposite to a side in the first state and a state in which the sheet P in the first time is rotated by 180 degrees. In both the first and second times, the sheet P is placed on the platen glass 30 so that the recess of the crease 70 faces down. Further, in both the first and second times, the sheet P is placed on the platen glass 30 so that the crease 70 is in a direction intersecting the sub-scanning direction DM (the moving direction of the illumination unit 20).

FIGS. 2A and 2B illustrate that the sheet P is placed on the platen glass 30 such that the crease 70 is perpendicular to the sub-scanning direction DM. The sheet P may only be placed on the platen glass 30 such that the crease 70 intersects the sub-scanning direction DM. A difference between the orientation of the sheet P in the first time and that in the second time does not need to be exactly 180 degrees. That is, the first state may be a state in which the sheet upper side 76 intersecting the crease 70 in the sheet P is directed to the first side Dir1 in the main scanning direction DH, and the second state may be a state in which the sheet upper side 76 is directed to the second side Dir2 in the main scanning direction DH (the opposite side to the first side Dir1).

Figure 3A:
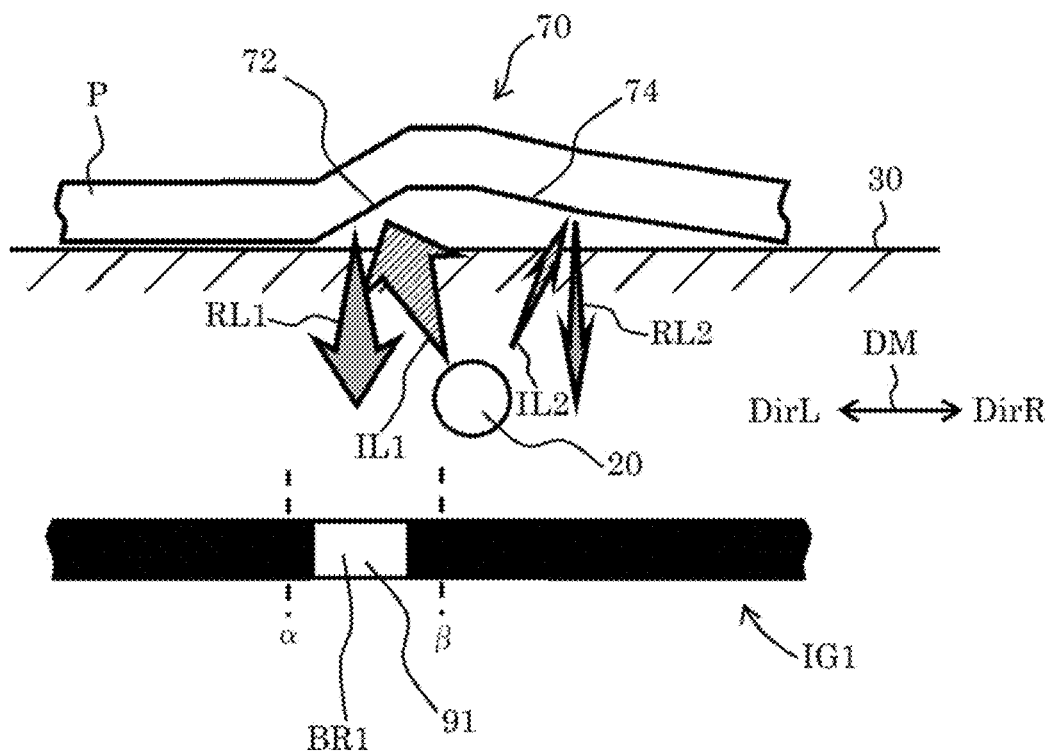
FIG. 3A is a diagram illustrating first sheet reading and first image information.
Figure 3B:
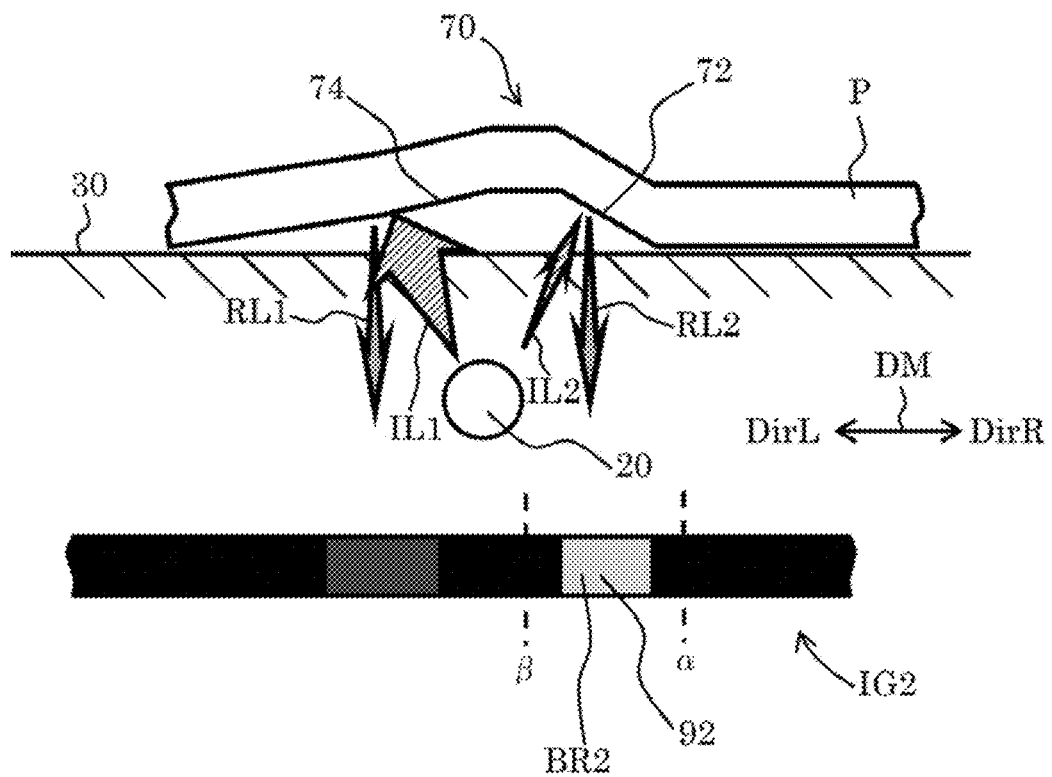
FIG. 3B is a diagram illustrating second sheet reading and second image information.

FIG. 3A is a diagram illustrating (i) first sheet reading (a cross section of the sheet P and the platen glass 30) and (ii) first image information IG1 obtained by reading. FIG. 3B is a diagram illustrating (i) second sheet reading (a cross section of the sheet P and the platen glass 30) and (ii) second image information IG2 obtained by reading. The first image information IG1 and the second image information IG2 illustrated in FIGS. 3A and 3B, and the drawings to be described later are image information of a partial region of the sheet P in the direction along the crease 70, and a magnitude relation of brightness is illustrated in gray scale (it is illustrated that the brightness is higher as it is closer to white).

In FIG. 3A, the sheet P having the crease 70 in which a steeply inclined surface 72 is formed on a first side DirL in the sub-scanning direction DM and a gently inclined surface 74 is formed on a second side DirR in the first sheet reading is drawn. In the second sheet reading, since the sheet P is rotated from the first sheet reading, as illustrated in FIG. 3B, the gently inclined surface 74 is disposed on the first side DirL in the sub-scanning direction DM, and the steeply inclined surface 72 is disposed on the second side DirR in the sub-scanning direction DM. The position of the crease 70 to be specified in FIGS. 3A and 3B is a position β on the right side of the steeply inclined surface 72 in FIG. 3A (a position on the second side DirR in the sub-scanning direction DM), and a position β on the left side of the steeply inclined surface 72 in FIG. 3B (a position on the first side DirL in the sub-scanning direction DM).

As illustrated in FIGS. 3A and 3B, the illumination unit 20 has a smaller amount of light on the second side DirR than the amount of light on the first side DirL in the sub-scanning direction DM. That is, the amount of incident light on the second side DirR in the sub-scanning direction DM (hereinafter, referred to as second side incident light IL2) on the sheet P is smaller than the amount of incident light on the first side DirL in the sub-scanning direction DM (hereinafter, referred to as first side incident light IL1) on the sheet P. In the following description, the reflected light of the sheet P with respect to the first side incident light IL1 is referred to as first side reflected light RL1, and the reflected light of the sheet P with respect to the second side incident light IL2 is referred to as second side reflected light RL2. It is noted that in FIGS. 3A and 3B, and the drawings to be described later, the light is depicted as being divided into two on the first side DirL and second side DirR in the sub-scanning direction DM, but this is for convenience of description, and the light exists along the sub-scanning direction DM in the vicinity of the illumination unit 20.

As illustrated in FIGS. 3A and 3B, the larger the amount of incident light on the sheet P, the larger the amount of reflected light on the incident light, and the amount of reflected light is larger on the steeply inclined surface 72 than on the gently inclined surface 74 of the sheet P. As illustrated in FIG. 3A, since first side incident light IL1 having a large amount of light is reflected by the steeply inclined surface 72, first side reflected light RL1 having a large amount of light is obtained, and a high brightness portion BR1 corresponding to the position of the steeply inclined surface 72 appears in the first image information IG1. Further, as illustrated in FIG. 3B, since even second side incident light IL2 having a relatively small amount of light is reflected by the steeply inclined surface 72, second side reflected light RL2 having a relatively large amount of light is obtained, and a high brightness portion BR2 corresponding to the position of the steeply inclined surface 72 appears in the second image information IG2. Here, the brightness of the BR1 is larger than the brightness of the BR2.

Figure 5:
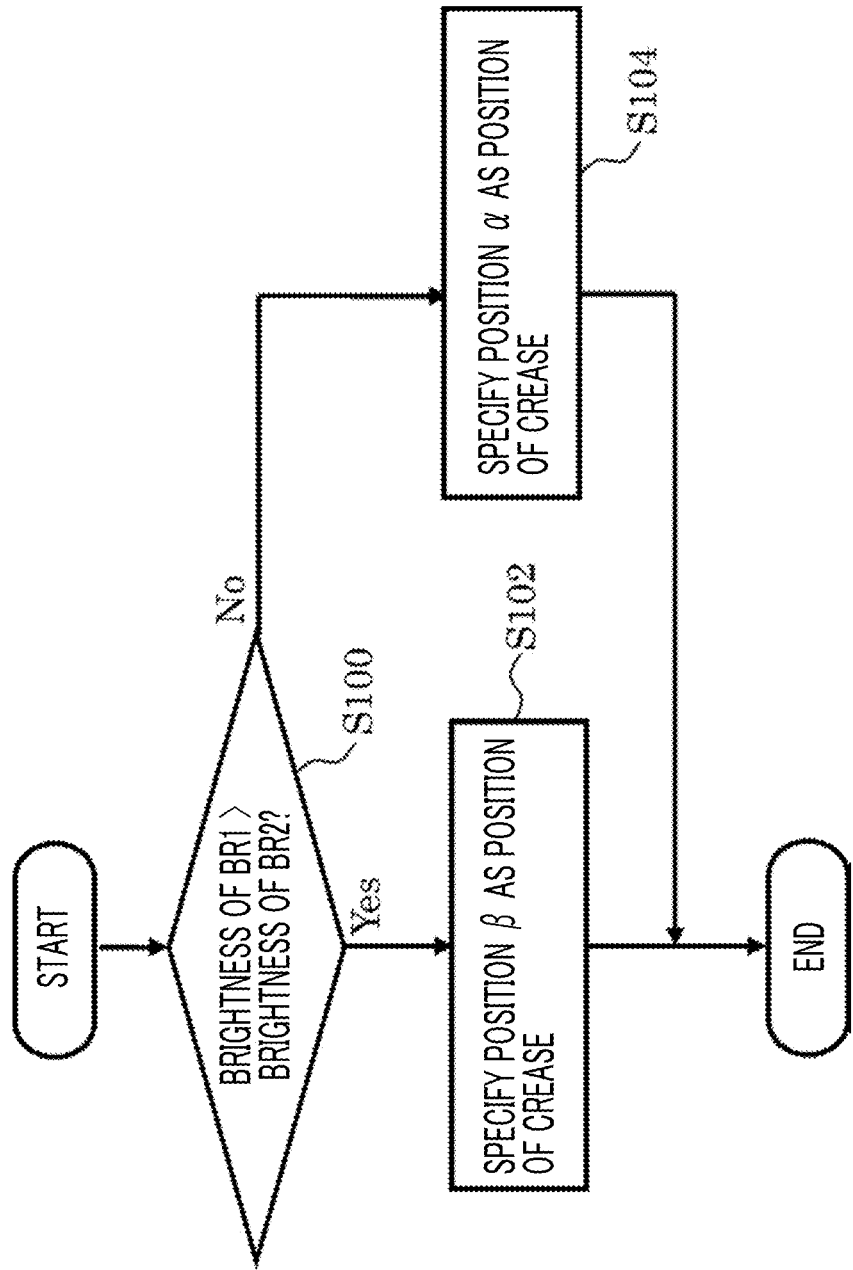
FIG. 5 is a flowchart illustrating a flow of specifying a position of a crease.

The acquiring unit 46 of the processor 40 of the image processing apparatus 14 acquires the first image information IG1 and the second image information IG2 from the image reading apparatus 12. Then, the specifying unit 48 of the processor 40 specifies a range (referred to as a first range 91)

in which the brightness is equal to or greater than a predetermined value in the first image information IG1, as the high brightness portion BR1 corresponding to the steeply inclined surface 72. Next, the specifying unit 48 of the processor 40 specifies one of two positions α and β adjacent to the first range 91 in the sub-scanning direction DM, as the position of the crease 70 in the sheet P. This is performed using a flow of FIG. 5. FIG. 5 is a flowchart illustrating a flow of specifying a position of the crease 70. In S100 of FIG. 5, the specifying unit 48 of the processor 40 checks whether or not the brightness of the BR1 is larger than the brightness of the BR2. For example, the specifying unit 48 of the processor 40 sets the maximum brightness in the region corresponding to the sheet P of the first image information IG1 as the brightness of the BR1, and sets the maximum brightness in the region corresponding to the sheet P of the second image information IG2 as the brightness of the BR2. Since the brightness of the BR1 is larger than the brightness of the BR2 in the case of FIGS. 3A and 3B, S100 is yes. In S102, the specifying unit 48 of the processor 40 specifies the position β adjacent to the second side DirR of the first range 91 in the sub-scanning direction DM, as the position of the crease 70. In this manner, the position of the weak crease 70 (also referred to as the center position) in the sheet P is specified.

The specifying unit 48 of the processor 40 may specify a range (referred to as a second range 92) in which the brightness is equal to or greater than a predetermined value in the second image information IG2 (see FIG. 3B) as the high brightness portion BR2 corresponding to the steeply inclined surface 72, and may specify the position β adjacent to the first side DirL of the second range 92 in the sub-scanning direction DM, as the position of the crease 70 in S102 of the flow of FIG. 5.

Figure 4A:
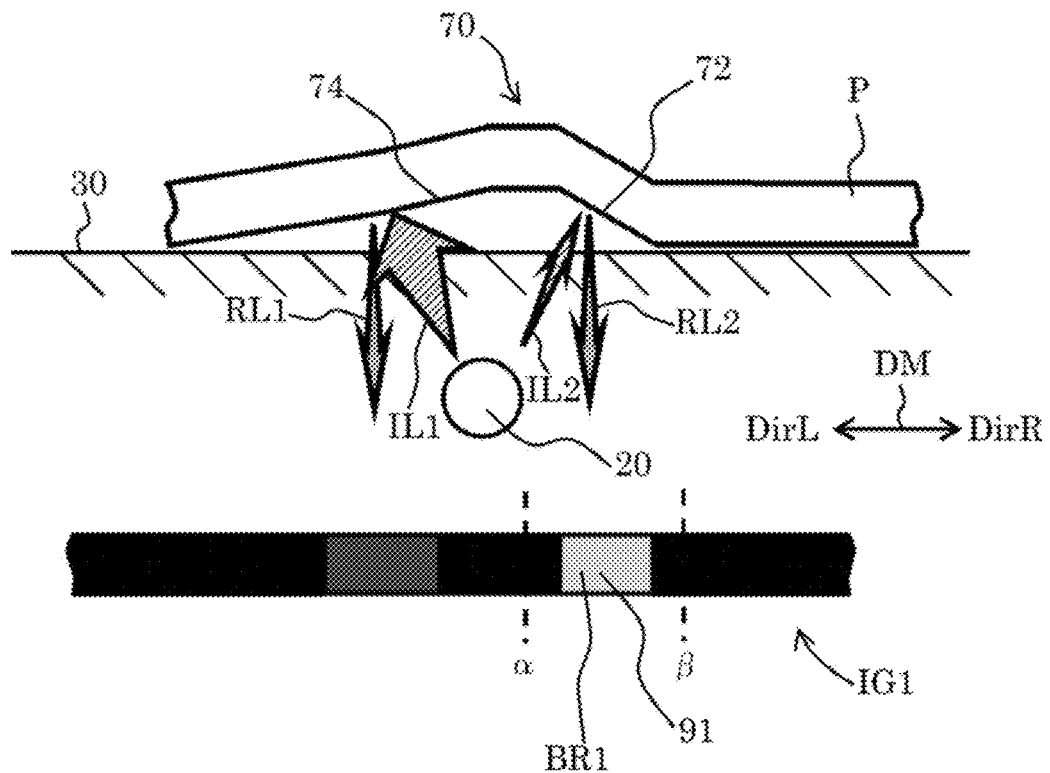
FIG. 4A is a diagram illustrating first sheet reading and first image information.
Figure 4B:
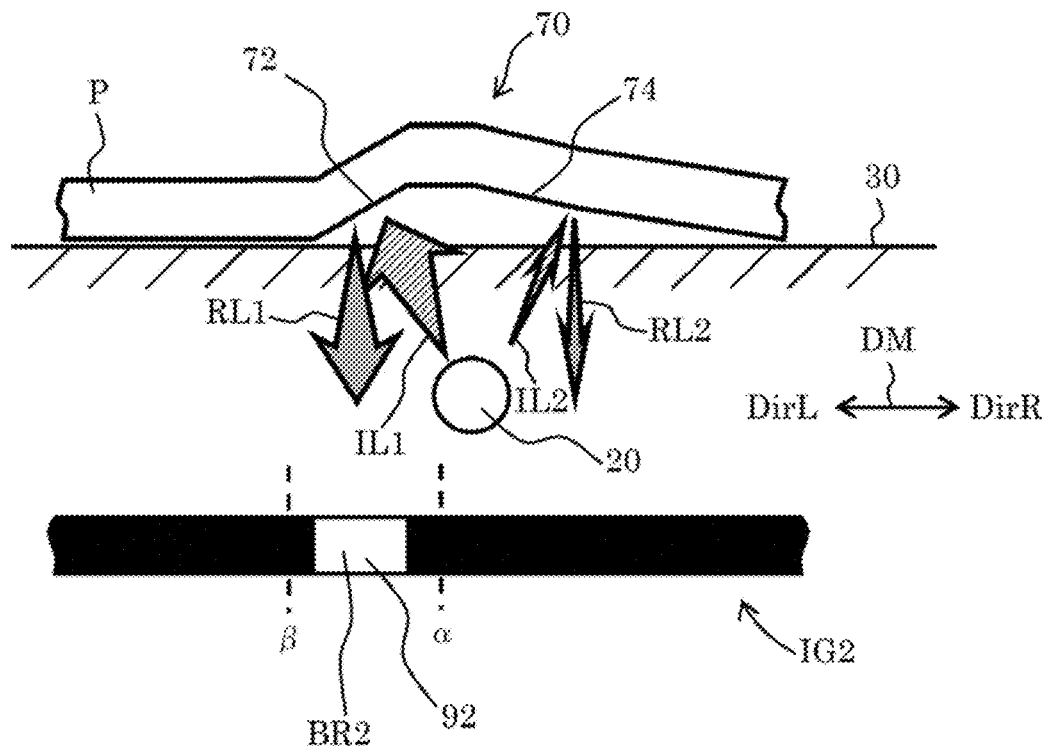
FIG. 4B is a diagram illustrating second sheet reading and second image information.

FIG. 4A is a diagram illustrating (i) first sheet reading (a cross section of the sheet P and the platen glass 30) of the sheet P in which the crease 70 is formed which has a horizontally flipped shape of the crease 70 illustrated in FIG. 3A, and (ii) first image information IG1 obtained by reading. The sheet P illustrated in FIG. 4A is the sheet P in which a gently inclined surface 74 is formed on a first side DirL in the sub-scanning direction DM and a steeply inclined surface 72 is formed on a second side DirR in the sub-scanning direction DM in the first sheet reading. FIG. 4B is a diagram illustrating (i) second sheet reading (a cross section of the sheet P and the platen glass 30) of the sheet P illustrated in FIG. 4A and (ii) second image information IG2 obtained by reading. The position of the creases 70 to be specified in FIGS. 4A and 4B is a position α on the left side of the steeply inclined surface 72 in FIG. 4A (a position on the first side DirL in the sub-scanning direction DM), and is a position α on the right side of the steeply inclined surface 72 in FIG. 4B (a position on the second side DirR in the sub-scanning direction DM).

As illustrated in FIG. 4A, since even second side incident light IL2 having a relatively small amount of light is reflected by the steeply inclined surface 72, second side reflected light RL2 having a relatively large amount of light is obtained, and a high brightness portion BR1 corresponding to the position of the steeply inclined surface 72 appears in the first image information IG1. Further, as illustrated in FIG. 4B, since first side incident light IL1 having a large amount of light is reflected by the steeply inclined surface 72, first side reflected light RL1 having a large amount of light is obtained, and a high brightness portion BR2 corresponding to the position of the steeply inclined surface 72 appears in the second image information IG2. Here, the brightness of the BR1 is smaller than the brightness of the BR2.

When the process of specifying the crease 70 described with reference to FIGS. 3A and 3B is performed on the first image information IG1 and the second image information IG2 of FIGS. 4A and 4B, since the brightness of the BR1 is smaller than the brightness of the BR2 in S100 of the flow of FIG. 5, S100 is No. Then, in S104, the specifying unit 48 of the processor 40 specifies a position α adjacent to a first side DirL of a first range 91 (see FIG. 4A) in the sub-scanning direction DM or a position α adjacent to a second side DirR of a second range 92 (see FIG. 4B) in the sub-scanning direction DM, as the position of the crease 70. As described above, according to the exemplary embodiment of the present disclosure, even when the crease 70 in the sheet P is weak, the position of the crease 70 is specified.

The following description will focus on the first sheet reading illustrated in FIGS. 3A and 4A. As illustrated in FIGS. 3A and 4A, the high brightness portion BR1 corresponding to the position of the steeply inclined surface 72 appears in the first image information IG1. In addition, the brightness of the high brightness portion BR1 changes depending on the shape of the crease 70 due to the uneven balance in the amount of light of the illumination unit 20. That is, the brightness of the BR1 when the steeply inclined surface 72 is on the first side DirL in the sub-scanning direction DM as illustrated in FIG. 3A is higher than the brightness of the BR1 when the steeply inclined surface 72 is on the second side DirR in the sub-scanning direction DM as illustrated in FIG. 4A. Therefore, it seems possible to specify a position of the crease 70 by one sheet reading. For example, if a threshold TH of brightness is defined in advance, it seems that the position β adjacent to the second side DirR of the first range 91 in the sub-scanning direction DM can be specified as the position of the crease 70 when brightness of BR1>threshold TH (in the case of FIG. 3A), and the position α adjacent to the first side DirL of the first range 91 in the sub-scanning direction DM can be specified as the position of the crease 70 when brightness of BR1≤threshold TH (in the case of FIG. 4A). However, in practice, for example, since the angle of the steeply inclined surface 72 differs depending on the sheet P, it is difficult to define such a threshold TH in advance, and there is a high possibility that an erroneous position is specified as the position of the crease 70. That is, it is difficult to accurately specify a position of the weak crease 70 by simply one sheet reading. On the other hand, according to the exemplary embodiment of the present disclosure, it is not necessary to define the threshold TH in advance as described above, and the sheet P is read twice to check the magnitude relation of the brightness of the two high brightness portions BR1 and BR2, so that a position of the weak crease 70 can be specified without an error or with reduced errors.

The position of the crease 70 can be defined as follows. For example, the position of the crease 70 can be defined by distances from a left side 78 or a right side 79 of the sheet (see FIG. 2A). As illustrated in FIGS. 2A and 2B, by separating the left side 78 or the right side 79 of the sheet from the edge of the platen glass 30, a brightness difference appears at a position corresponding to the left side 78 or the right side 79 in the first image information and the second image information. In the first image information or the second image information, by counting the number of pixels from the position of the brightness difference of the left side 78 or the right side 79 to the specified position of the crease 70, the physical distance from the left side 78 or the right side 79 of the sheet P to the position of the crease 70 can be known. Further, for example, if a desired position of the crease 70 is stored in advance in the memory 42 of the image processing apparatus 14, the processor 40 of the image processing apparatus 14 can calculate the amount of deviation between the specified position of the crease 70 and the desired position of the crease (hereinafter also referred to as the amount of deviation of the crease).

The specified position of the crease or the amount of deviation of the crease is sent to the crease forming device 52. The crease forming device 52 corrects positions where creases are formed in sheets P to be processed subsequently based on the information. As a result, in the sheet P to be processed later, the position of the crease 70 becomes a desired position or closer to the desired position. The specified position of the crease, the amount of deviation of the crease, or information based thereon (such as an adjustment value of the crease forming device) may be displayed on an operation panel or the like included in the image forming apparatus 10.

As described above, the illumination unit 20 of the image reading apparatus 12 has an uneven balance in the amount of light in the sub-scanning direction DM. However, this does not necessarily mean that a special image reading apparatus is used. The inventor confirms that some of image reading apparatuses (image scanners) currently used in offices include an illumination unit 20 having an uneven balance in the amount of light in the sub-scanning direction DM. Therefore, it is noted that a general image reading apparatus may be used in the exemplary embodiment described above.

Next, a modification example will be described. In the exemplary embodiment described above, the sheet P is placed on the platen glass 30 of the image reading apparatus 12 so that the recess of the crease 70 faces down, and the sheet P is read. However, the sheet P may be placed on the platen glass 30 so that the recess of the crease 70 faces up and the sheet P may be read. Even in this case, the high brightness portions BR1 and BR2 corresponding to the position of the steeply inclined surface on the back side of the recess in the sheet P appear in the first image information IG1 and the second image information IG2, and a position of the crease 70 is specified.

In the exemplary embodiment described above, the position of the crease is specified, but the position of the fold (the same as the folding position) may be specified. The sheet P folded by the folding device 54 (see FIG. 1) included in the image forming apparatus 10 is placed on the platen glass 30 so that the recess of the fold faces down or the recess faces up in a state in which the sheet P is unfolded, and reading is performed. The position of the fold is specified by performing the same process as the above-described process of specifying the position of the crease. The specified position of the fold or the amount of deviation between the specified position of the fold and a desired position of the fold (also referred to as the amount of deviation of the fold) is sent to the folding device 54, and the folding device 54 corrects the position of the fold in the sheet P based on the information. As a result, the position of the fold in the sheet P to be folded by the folding device 54 thereafter becomes a desired position or closer to the desired position. It is noted that creases and folds are collectively referred to as "folding lines".

In the exemplary embodiment described above, the image reading apparatus 12, the image processing apparatus 14, the image forming unit 18, the crease forming device 52, and the folding device 54 are integrated, but they may be separate devices that are physically separated from each other. In addition, any two, three, or four of the image reading apparatus 12, the image processing apparatus 14, the image forming unit 18, the crease forming device 52, and the folding device 54 may be integrated to constitute a device. In these cases, the transfer of data between the devices may be performed by electrical connection or by a portable memory such as a USB memory. Further, in these cases, the specified position of the folding line, the amount of deviation of the folding line (including the amount of deviation of the crease or the amount of deviation of the fold), or information based thereon (such as the adjustment value of the device) may be displayed on the display panel or the like.

Further, in the exemplary embodiment described above, the image reading apparatus 12 having the illumination unit 20 in which the amount of light on the second side DirR is smaller than the amount of light on the first side DirL in the sub-scanning direction DM is used, but the image reading apparatus 12 having another illumination unit 20 in which the amount of light on the second side DirR is larger than the amount of light on the first side DirL in the sub-scanning direction DM may be used. The process of specifying a position of the crease using the other illumination unit 20 will be described below with reference to FIGS. 6A, 6B, 7A, 7B, and 8.

Figure 6A:
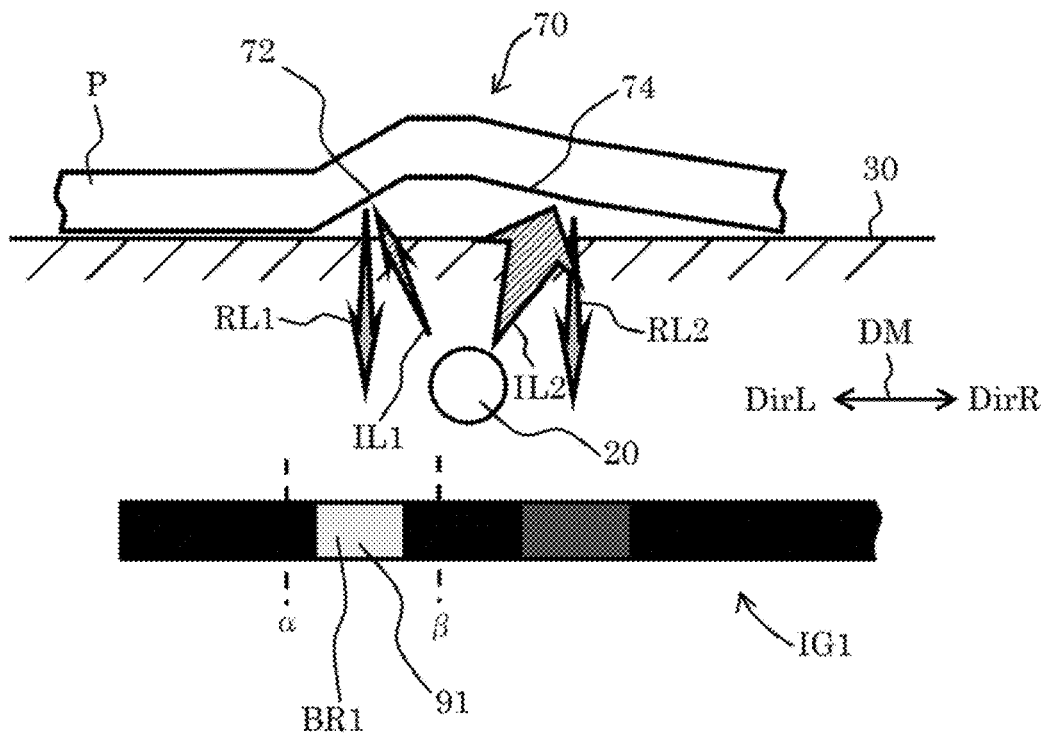
FIG. 6A is a diagram illustrating first sheet reading using another illumination unit and first image information.
Figure 6B:
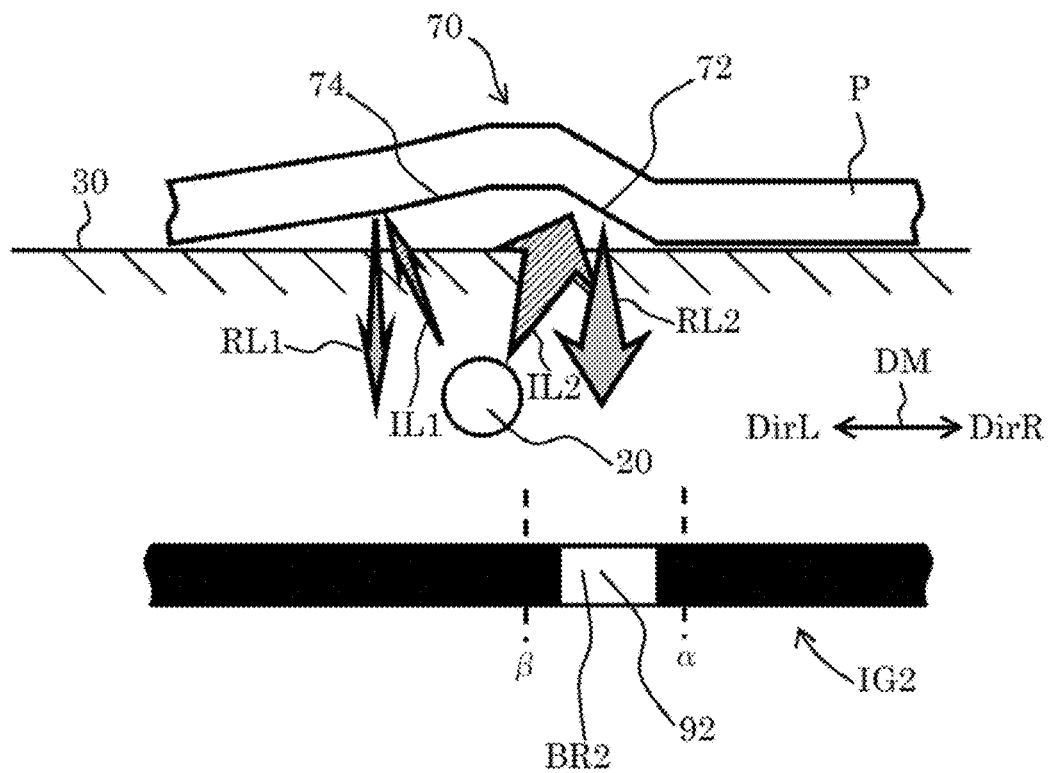
FIG. 6B is a diagram illustrating second sheet reading using the other illumination unit and second image information.

In FIG. 6A, a sheet P having a crease 70 in which a steeply inclined surface 72 is formed on a first side DirL in the sub-scanning direction DM and a gently inclined surface 74 is formed on a second side DirR in first sheet reading is drawn. In second sheet reading, since the sheet P is rotated from the first sheet reading, as illustrated in FIG. 6B, the gently inclined surface 74 is disposed on the first side DirL in the sub-scanning direction DM, and the steeply inclined surface 72 is disposed on the second side DirR in the sub-scanning direction DM. The position of the crease 70 to be specified in FIGS. 6A and 6B is a position β on the right side of the steeply inclined surface 72 in FIG. 6A (a position on the second side DirR in the sub-scanning direction DM), and a position β on the left side of the steeply inclined surface 72 in FIG. 6B (a position on the first side DirL in the sub-scanning direction DM).

As illustrated in FIG. 6A, since even first side incident light IL1 having a relatively small amount of light is reflected by the steeply inclined surface 72, first side reflected light RL1 having a relatively large amount of light is obtained, and a high brightness portion BR1 corresponding to the position of the steeply inclined surface 72 appears in the first image information IG1. Further, as illustrated in FIG. 6B, since second side incident light IL2 having a large amount of light is reflected by the steeply inclined surface 72, second side reflected light RL2 having a large amount of light is obtained, and a high brightness portion BR2 corresponding to the position of the steeply inclined surface 72 appears in the second image information IG2. Here, the brightness of the BR1 is smaller than the brightness of the BR2.

FIG. 8 is a flowchart illustrating a flow of specifying a position of the crease 70 when the other illumination unit 20 is used. In S200 of FIG. 8, the specifying unit 48 of the processor 40 checks whether or not the brightness of the BR1 is larger than the brightness of the BR2. In the case of FIGS. 6A and 6B, since the brightness of the BR1 is smaller than the brightness of the BR2, S200 is No, and in S204, the specifying unit 48 of the processor 40 specifies a position β adjacent to a second side DirR of a first range 91 (see FIG. 6A) in the sub-scanning direction DM or a position β adjacent to a first side DirL of a second range 92 (see FIG.

6B) in the sub-scanning direction DM, as the position of the crease 70. In this manner, the position of the weak crease 70 (the center position) in the sheet P is specified.

Figure 7A:
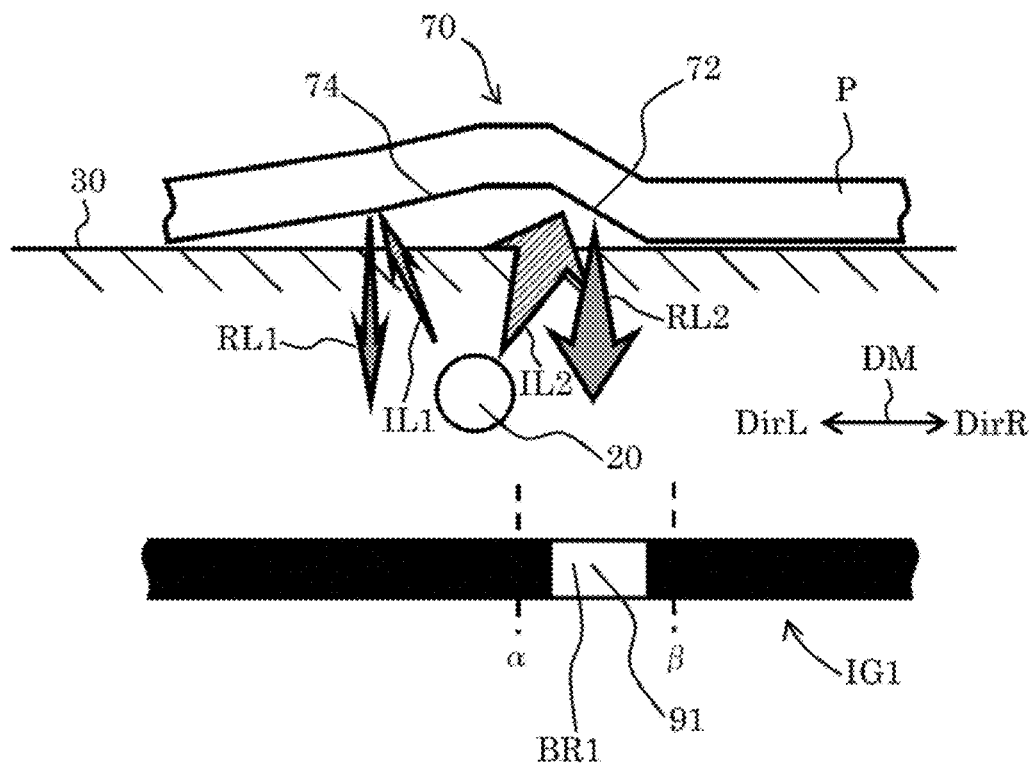
FIG. 7A is a diagram illustrating first sheet reading using the other illumination unit and first image information.
Figure 7B:
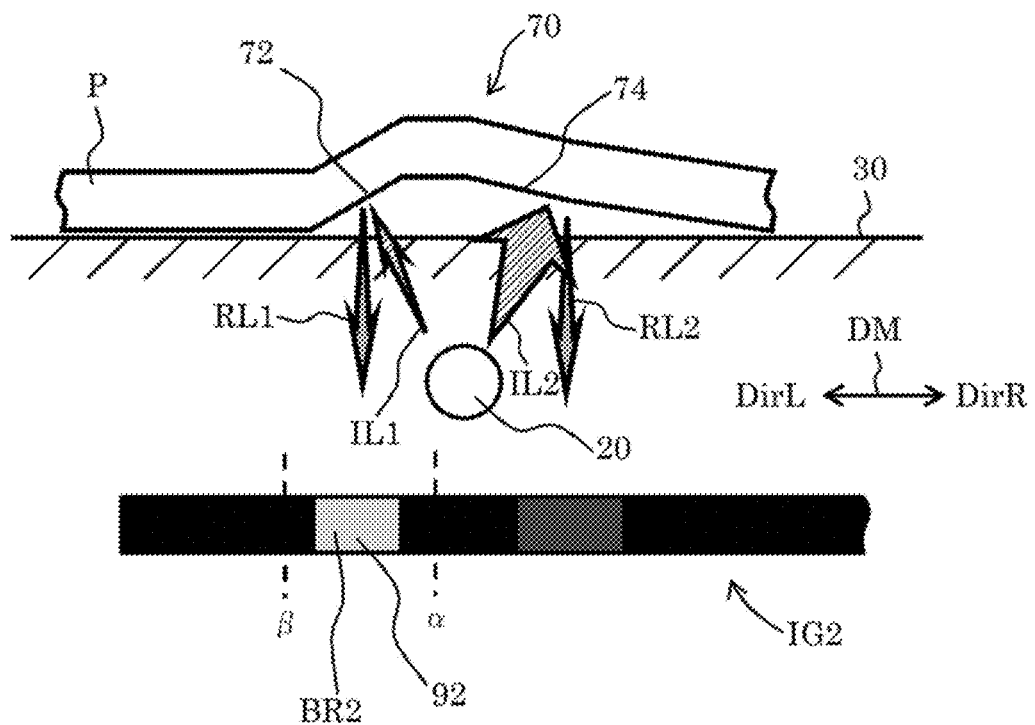
FIG. 7B is a diagram illustrating second sheet reading using the other illumination unit and second image information.

FIG. 7A is a diagram illustrating (i) first sheet reading (a cross section of the sheet P and the platen glass 30) of the sheet P in which the crease 70 is formed which has a horizontally flipped shape of the crease illustrated in FIG. 6A, and (ii) first image information IG1 obtained by reading. The sheet P illustrated in FIG. 7A is the sheet P in which a gently inclined surface 74 is formed on a first side DirL in the sub-scanning direction DM and a steeply inclined surface 72 is formed on a second side DirR in the sub-scanning direction DM in the first sheet reading. FIG. 7B is a diagram illustrating (i) second sheet reading (a cross section of the sheet P and the platen glass 30) of the sheet P illustrated in FIG. 7A and (ii) second image information IG2 obtained by reading. The position of the creases 70 to be specified in FIGS. 7A and 7B is a position α on the left side of the steeply inclined surface 72 in FIG. 7A (a position on the first side DirL in the sub-scanning direction DM), and is a position α on the right side of the steeply inclined surface 72 in FIG. 7B (a position on the second side DirR in the sub-scanning direction DM).

As illustrated in FIG. 7A, since second side incident light IL2 having a large amount of light is reflected by the steeply inclined surface 72, second side reflected light RL2 having a large amount of light is obtained, and a high brightness portion BR1 corresponding to the position of the steeply inclined surface 72 appears in the first image information IG1. Further, as illustrated in FIG. 7B, since even first side incident light IL1 having a relatively small amount of light is reflected by the steeply inclined surface 72, first side reflected light RL1 having a relatively large amount of light is obtained, and a high brightness portion BR2 corresponding to the position of the steeply inclined surface 72 appears in the second image information IG2. Here, the brightness of the BR1 is larger than the brightness of the BR2. In the case of FIGS. 7A and 7B, in S200 of the flow of FIG. 8, since the brightness of the BR1 is larger than the brightness of the BR2, S200 is yes, and in S202, the specifying unit 48 of the processor 40 specifies a position α adjacent to a first side DirL of a first range 91 (see FIG. 7A) in the sub-scanning direction DM or a position α adjacent to a second side DirR of a second range 92 (see FIG. 7B) of the sub-scanning direction DM, as the position of the crease 70. In this manner, the position of the weak crease 70 in the sheet P is specified.

In the exemplary embodiment described above, the second sheet reading is performed by rotating the sheet P of the first sheet reading. However, instead of rotating the sheet P, the second sheet reading may be performed by changing light of the illumination unit 20 of the image reading apparatus 12 from the first sheet reading. For example, the first sheet reading is performed with the illumination unit 20 in a state in which the amount of light on the second side DirR is smaller than the amount of light on the first side DirL in the sub-scanning direction DM as illustrated in FIG. 3A, and the second sheet reading is performed by changing the illumination unit 20 to a state in which the amount of light on the second side DirR is larger than the amount of light on the first side DirL in the sub-scanning direction DM, as illustrated in FIG. 6A, without rotating the sheet P from the first sheet reading.

In the above-described exemplary embodiments, a processor refers to a broadly defined processor, and includes a general-purpose processor (e.g., CPU: Central Processing Unit, etc.) and a special-purpose processor (e.g., GPU: Graphics Processing Unit, ASIC: Application Specific Integrated Circuit, FPGA: Field Programmable Gate Array, programmable logic device, etc.).

Further, the operation by the processor in each of the exemplary embodiments may be performed not only by one processor but also by plural processors present at physically separated positions in cooperation. The order of the operations by the processors is not limited to the order described in the respective exemplary embodiments, and may be changed as appropriate.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
acquire image information obtained by an image reading apparatus including a light source emitting to a sheet an uneven balance in an amount of light in a sub-scanning direction, wherein the light source of the image reading apparatus is disposed underneath the sheet, wherein the light source emits to the sheet a different amount of light on a second side in the sub-scanning direction than that on a first side in the sub-scanning direction; and
specify a position of a folding line in the sheet from the acquired image information, wherein
the acquiring by the processor comprises acquiring
first image information obtained by reading a surface of the sheet in a first state, using the light source, in which the folding line in the sheet is positioned in a direction intersecting the sub-scanning direction of the image reading apparatus, and an outer edge of the sheet faces toward a first main scanning direction perpendicular to the sub-scanning direction, and
second image information obtained by rotating the sheet to a second state and reading the same surface of the sheet in the second state, in which the outer edge of the sheet faces toward a second main scanning direction that is opposite to the first main scanning direction, and the same surface of the sheet is read in the second state using the same light source as used in the first state, and
the specifying by the processor comprises specifying the position of the folding line in the sheet based on the first image information and the second image information.

2. The image processing apparatus according to claim 1, wherein
the first image information and the second image information are image information obtained by the image reading apparatus by moving the light source in the sub-scanning direction and receiving reflected light from the sheet.

3. The image processing apparatus according to claim 1, wherein the first state is a state in which a upper side of the sheet intersecting the folding line in the sheet is directed to one side, and the second state is a state in which the upper side of the sheet is directed to an opposite side to the one side.

4. The image processing apparatus according to claim 2, wherein the first state is a state in which a upper side of the sheet intersecting the folding line in the sheet is directed to one side, and the second state is a state in which the upper side of the sheet is directed to an opposite side to the one side.

5. The image processing apparatus according to claim 1, wherein the processor specifies the position of the folding line in the sheet based on a magnitude relation between brightness of the first image information and brightness of the second image information.

6. The image processing apparatus according to claim 2, wherein the processor specifies the position of the folding line in the sheet based on a magnitude relation between brightness of the first image information and brightness of the second image information.

7. The image processing apparatus according to claim 3, wherein the processor specifies the position of the folding line in the sheet based on a magnitude relation between brightness of the first image information and brightness of the second image information.

8. The image processing apparatus according to claim 4, wherein the processor specifies the position of the folding line in the sheet based on a magnitude relation between brightness of the first image information and brightness of the second image information.

9. The image processing apparatus according to claim 1, wherein the processor specifies, as the position of the folding line in the sheet, one of two positions adjacent to a first range or a second range in the sub-scanning direction based on a magnitude relation between brightness of the first image information and brightness of the second image information, the first range is a range in the first image information where brightness is equal to or greater than a predetermined value, and the second range is a range in the second image information where brightness is equal to or greater than the predetermined value.

10. The image processing apparatus according to claim 9, wherein the light source has a smaller amount of light on a second side in the sub-scanning direction than that on a first side in the sub-scanning direction, and when the brightness of the first image information is larger than the brightness of the second image information, the processor specifies, as the position of the folding line in the sheet, a position adjacent to the second side of the first range in the sub-scanning direction or a position adjacent to the first side of the second range in the sub-scanning direction.

11. The image processing apparatus according to claim 9, wherein the light source has a smaller amount of light on a second side in the sub-scanning direction than that on a first side in the sub-scanning direction, and when the brightness of the first image information is smaller than the brightness of the second image information, the processor specifies, as the position of the folding line in the sheet, a position adjacent to the first side of the first range in the sub-scanning direction or a position adjacent to the second side of the second range in the sub-scanning direction.

12. The image processing apparatus according to claim 9, wherein the light source has a larger amount of light on a second side in the sub-scanning direction than that on a first side in the sub-scanning direction, and when the brightness of the first image information is larger than the brightness of the second image information, the processor specifies, as the position of the folding line in the sheet, a position adjacent to the first side of the first range in the sub-scanning direction or a position adjacent to the second side of the second range in the sub-scanning direction.

13. The image processing apparatus according to claim 9, wherein the light source has a larger amount of light on a second side in the sub-scanning direction than that on a first side in the sub-scanning direction, and when the brightness of the first image information is smaller than the brightness of the second image information, the processor specifies, as the position of the folding line in the sheet, a position adjacent to the second side of the first range in the sub-scanning direction or a position adjacent to the first side of the second range in the sub-scanning direction.

14. The image processing apparatus according to claim 1, wherein the folding line is a crease having one steeply inclined surface and one gently inclined surface, wherein a recess of the crease faces down to the light source.

15. The image processing apparatus according to claim 1, wherein the folding line is a fold.

16. A crease forming device that changes a position where a crease is formed in a sheet based on the position of the crease in the sheet, which is specified by the image processing apparatus according to claim 14.

17. A folding device that changes a folding position in a sheet based on the position of the fold of the sheet, which is specified by the image processing apparatus according to claim 15.

18. An image processing method comprising:

acquiring image information obtained by an image reading apparatus including a light source emitting to a sheet an uneven balance in an amount of light in a sub-scanning direction, wherein the light source of the image reading apparatus is disposed underneath the sheet, wherein the light source emits to the sheet a different amount of light on a second side in the sub-scanning direction than that on a first side in the sub-scanning direction; and specifying a position of a folding line in the sheet from the acquired image information, wherein the acquiring comprises acquiring first image information obtained by reading a surface of the sheet in a first state, using the light source, in which the folding line in the sheet is positioned in a direction intersecting the sub-scanning direction of the image reading apparatus, and an outer edge of the sheet faces toward a first main scanning direction perpendicular to the sub-scanning direction, and second image information obtained by rotating the sheet to a second state and reading the same surface of the sheet in the second state, in which the outer edge of the sheet faces toward a second main scanning direction that is opposite to the first main scanning direction, and the same surface of the sheet is read in the second state using the same light source as used in the first state, and the specifying comprises specifying the position of the folding line in the sheet based on the first image information and the second image information.

\* \* \* \* \*